Figure 3:
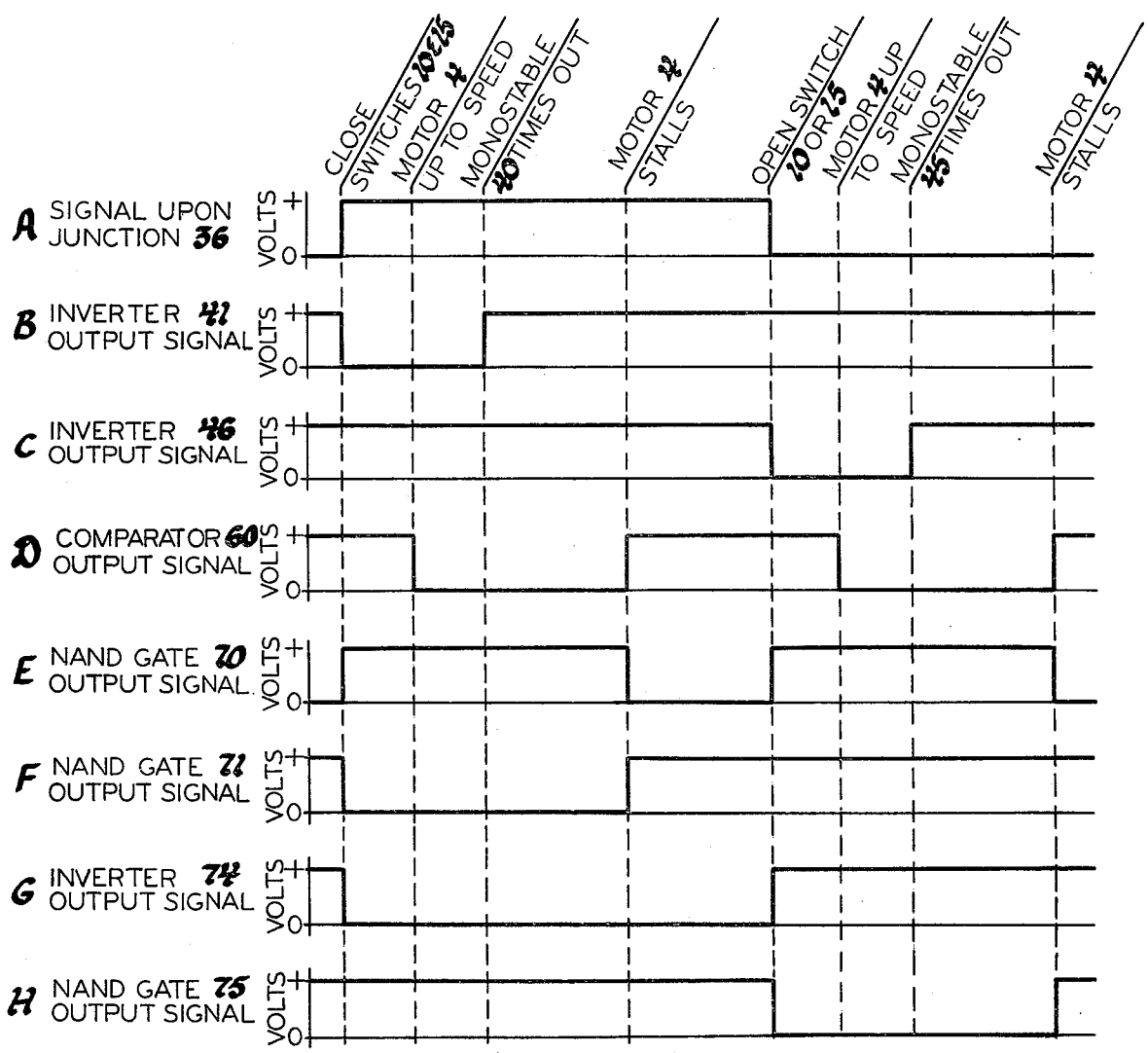

United States Patent [19]

Graham

[11] 4,138,630
[45] Feb. 6, 1979

[54] ELECTRIC MOTOR REVERSING CONTROL SYSTEM

[75] Inventor: Donald E. Graham, Centerville, Ohio

[73] Assignee: General Motors Corporation, Detroit, Mich.

[21] Appl. No.: 813,166

[22] Filed: Jul. 5, 1977

[51] Int. Cl.² .............................................. H02P 1/40
[52] U.S. Cl. ..................................... 318/257; 318/282
[58] Field of Search ............... 318/282, 257, 266, 293; 246/125, 219, 238; 343/901

[56] References Cited

U.S. PATENT DOCUMENTS 3,222,584  12/1965  Du Rocher ......................... 318/293

Primary Examiner—Herman J. Hohauser
Attorney, Agent, or Firm—Richard G. Stahr

[57] ABSTRACT

Electrically operable switching circuitry is effective to energize, in response to the application of a control signal, a commutated electrical motor in a first direction for driving a member driven thereby through a travel stroke and to energize, in response to the removal of the control signal, the motor in a second direction for driving the member driven thereby through another opposite travel stroke and an electrical signal produced while the motor is in the run mode is effective to maintain the switching circuitry operated for motor energization. Upon motor stall when the member driven thereby has reached the end of a travel stroke, the electrical signal produced while the motor is in the "Run" mode terminates and the switching circuitry then operates to deenergize the motor.

7 Claims, 4 Drawing Figures

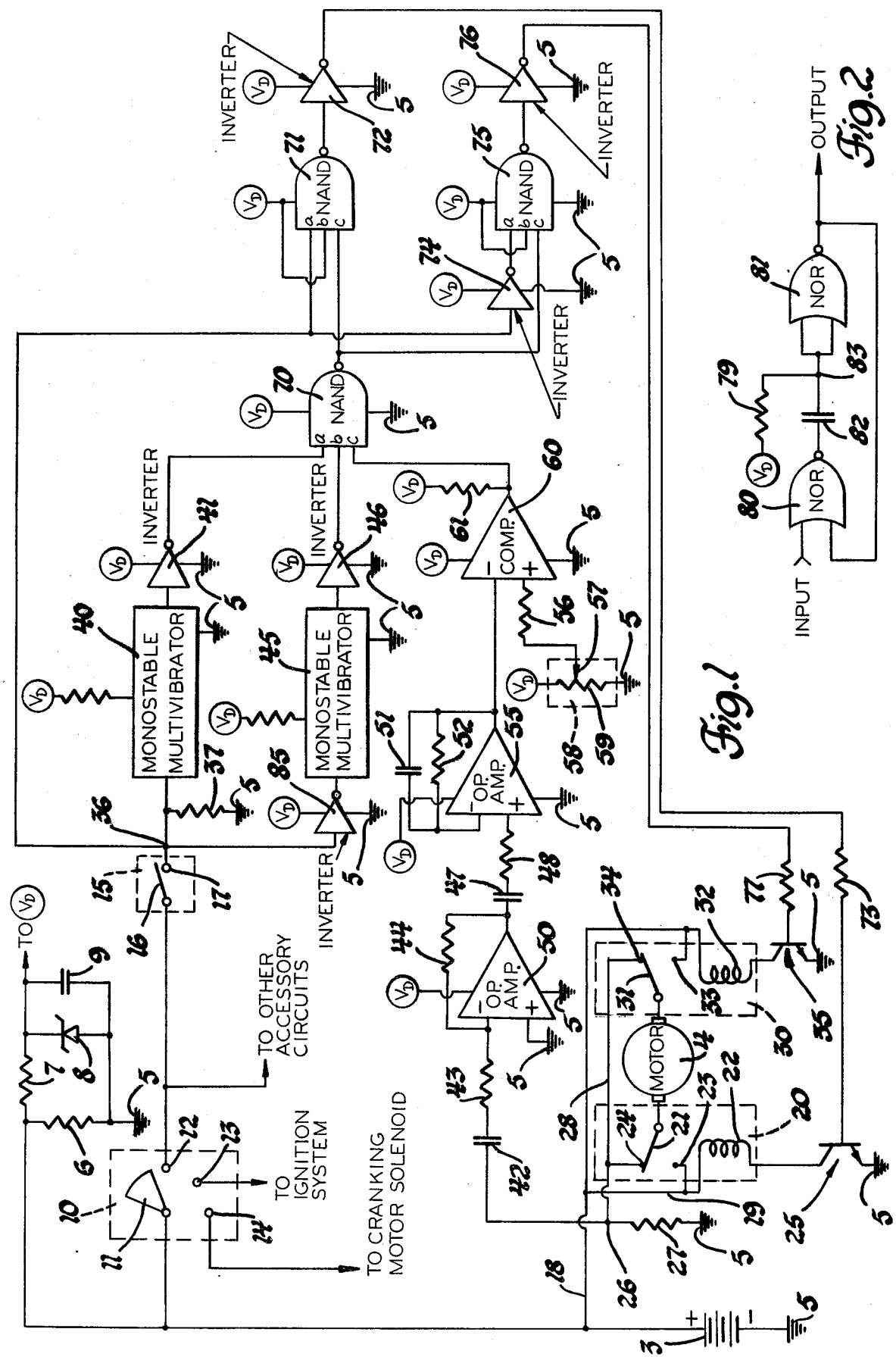

ELECTRIC MOTOR REVERSING CONTROL SYSTEM

This invention is directed to an improved electric motor control system and, more specifically, to an improved electric motor reversing control system.

With applications in which an electric motor is employed to drive a driven member through two opposite travel strokes, it has heretofore been necessary to provide mechanically operated limit switch arrangements through which the motor is deenergized at each travel limit and the circuit is conditioned for motor energization in the opposite direction upon the closure of a selector switch to the position in which the motor is energized in this direction. Mechanically operated limit switches, it has been found, are subject to mechanical maladjustment and in applications having limited space available, are too cumbersome to be used or if small enough to be accommodated by the space available are too fragile for sustained operating periods. Therefore, an electric motor reversing control system which provides for the energization of an electric motor alternately in opposite directions without the use of mechanically operated limit switching arrangements is desirable.

It is, therefore, an object of this invention to provide an improved electric motor reversing control system.

It is another object of this invention to provide an improved electric motor reversing control system which provides for the energization of an electric motor alternately in opposite directions and deenergizes the motor at the end of each travel stroke of a member driven thereby without the necessity of mechanically operated limit switches.

It is an additional object of this invention to provide an improved electric motor reversing control system which is responsive to motor stall when a member driven thereby has reached a travel limit for effecting motor deenergization.

It is a further object of this invention to provide an improved electric motor reversing control system which effects motor energization for rotation in a first direction upon the application of a control signal; deenergizes the motor automatically when a member driven thereby has reached a travel stroke limit and effects motor energization for rotation in the opposite direction upon the removal of the control signal.

In accordance with this invention a commutated electric motor reversing control system effective to energize the motor for rotation alternately in opposite directions for driving a member driven thereby through respective opposite travel strokes is provided wherein electrically operable switching circuitry is effective to energize the motor for rotation in a first direction upon the application on an electrical signal produced by circuitry responsive to both a discrete electrical signal produced upon the application of a control signal and the control signal and to energize the motor for rotation in a second opposite direction upon the application thereto of another discrete electrical signal produced by circuitry responsive to both a discrete electrical signal produced upon the removal of the control signal and the removal of the control signal and to deenergize the motor upon the stall thereof when the member driven thereby has reached the end of a travel stroke.

Figure 4:
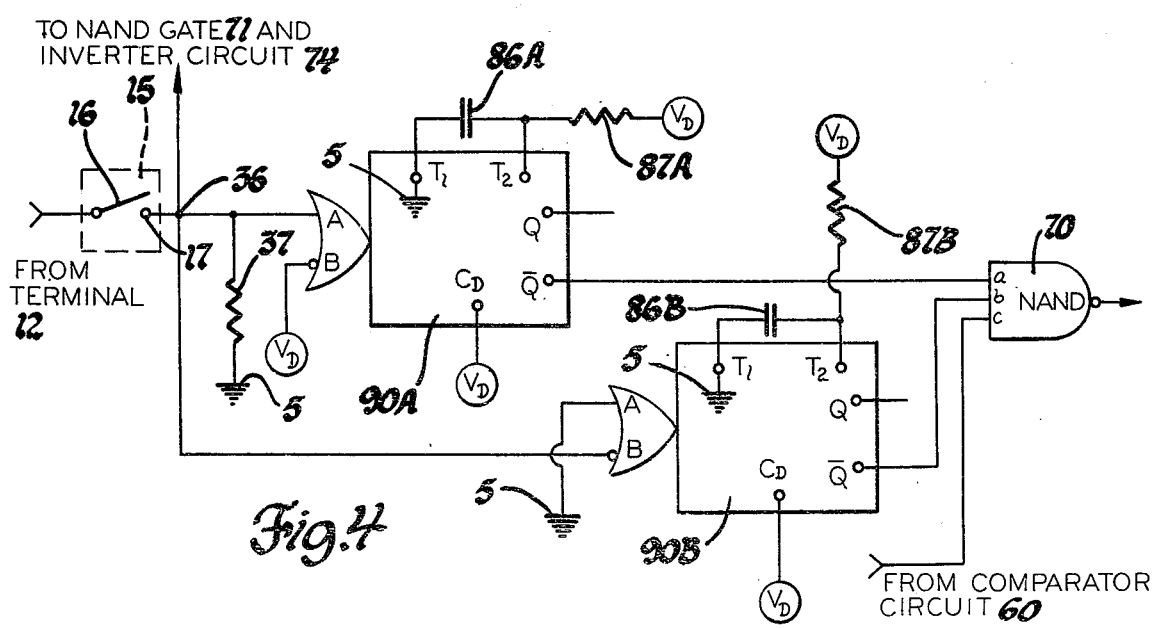

For a better understanding of the present invention, together with additional objects, advantages and features thereof, reference is made to the following description and accompanying drawings in which:

FIG. 1 sets forth the electric motor reversing control system of this invention partially in schematic and partially in block form;

FIG. 2 sets forth schematically a monostable multivibrator circuit suitable for use with the circuit of FIG. 1;

FIG. 3 is a set of curves useful in understanding the sequence of operations of the circuit of FIG. 1; and FIG. 4 is an alternate monostable multivibrator circuit suitable for use with the circuit of FIG. 1.

As point of reference or ground potential is the same point electrically throughout the system, it is illustrated in the drawing by the accepted schematic symbol and is referenced by the numeral 5.

In accordance with logic terminology well known in the art, throughout this specification the logic signals will be referred to as "high" or logic 1 and "low" or logic 0 signals. For purposes of this specification, and without intention or inference of a limitation thereto, the "high" or logic 1 signals will be considered to be of a positive polarity potential and the "low" or logic 0 signals will be considered to be of zero or ground potential.

Conventional NAND gate circuits, inverter circuits, operational amplifier and voltage comparator circuits may be employed to practice this invention. As these circuit elements are commercially available items well-known in the art and, per se, form no part of this invention, each has been illustrated in block form in the drawing. In an actual embodiment, the NAND gate circuits, the inverter circuits and the operational amplifier circuits employed are commercially available devices marketed by Motorola, Inc. under the respective designations MC14023, MC14049 and MC3301. The comparator circuit may be a commercially available device marketed by the National Semiconductor Corp. under the designation LM2901. Furthermore, these devices are only examples of circuit elements suitable for use with the system of this invention, consequently, there is no intention or inference of a limitation thereto as other circuitry and elements having similar electrical characteristics may be substituted therefor without departing from the spirit of the invention.

One embodiment of the electric motor reversing control system of this invention is set forth partially in schematic and partially in block form in FIG. 1 of the drawing.

Briefly, this electric motor reversing control system may be used to control a commutated electric motor capable of being stalled. Electrically operable switching circuitry is effective to energize the motor for rotation in a first direction and in a second direction in response to respective mutually exclusive electrical signals and to deenergize the motor upon the termination of either of these signals. Also included is direction of motor rotation determining circuitry enabled in response to the application of a control signal thereto and to the removal of the control signal therefrom for producing, while so enabled, respective mutually exclusive electrical signals effective to operate the switching means to energize the motor for rotation in a first direction and to operate the switching means to energize the motor for rotation in a second direction. Circuitry responsive to motor energizing current ripple is effective to maintain the direction of motor rotation determining circuitry enabled while the motor is in the "Run" mode and to disable this circuitry upon motor stall when a member driven thereby has reached either of two travel limits.

In an actual embodiment, the electric motor reversing control system of this invention is employed to control the operating motor of an automotive type extensible radio antenna such as that disclosed and described in U.S. Pat. No. 3,253,799, Till, which issued May 31, 1966 and is assigned to the same assignee as is this invention. This system, however, may be used with motors of either the permanent magnet or wound field types adapted for commutator energization.

Referring to FIG. 1 of the drawing, system operating potential may be supplied by a conventional automotive type storage battery 3 having the negative polarity terminal connected to point of reference or ground potential 5 and the positive polarity terminal connected to the movable contact 11 of electrical switch 10 and to a network comprising resistors 6 and 7, Zener diode 8 and capacitor 9. Electrical switch 10 may be a conventional automotive type ignition switch having an open or "Off" position, at which it is shown in the FIGURE, a "Run" position at which movable contact 11 is closed to stationary contacts 12 and 13 and a "Crank" position at which movable contact 11 is closed to stationary contacts 13 and 14. As is well known in the art, ignition switches of this type are spring biased to automatically return to the "Run" position from the "Crank" position wherein movable contact 11 is closed to stationary contacts 12 and 13 when the torque applied to the ignition key is released. The network including resistors 6 and 7, Zener diode 8 and capacitor 9 provide transient protection and also a regulated supply potential $V_D$ for the circuit of this invention.

Stationary contact 12 of ignition switch 10 is connected to the movable contact 16 of a single pole, single throw electrical switch 15. In the actual embodiment, switch 15 is the conventional radio On-Off switch well known in the art.

The electrically operable switching circuitry effective to energize motor 4 for rotation in a first direction and in a second direction in response to respective mutually exclusive electrical signals and to deenergize motor 4 upon the termination of these signals may be a pair of conventional single pole, double throw electrically operated relays 20 and 30. Movable contacts 21 of relay 20 and 31 of relay 30 are connected to respective brushes of motor 4 in sliding contact with the commutator; operating coil 22 and stationary contact 23 of relay 20 and operating coil 32 and stationary contact 33 of relay 30 are connected to the positive polarity output terminal of battery 3 through lead 18 and stationary contacts 24 of relay 20 and 34 of relay 30 are connected to point of reference or ground potential 5 through lead 28, junction 26 and resistor 27. The terminal end of operating coil 22 of relay 20 opposite that connected to battery 3 is connected to point of reference or ground potential 5 through the current carrying electrodes, the collector-emitter electrodes, of an NPN transistor 25 and the terminal end of operating coil 32 of relay 30 opposite that connected to battery 3 is connected to point of reference or ground potential 5 through the current carrying electrodes, the collector-emitter electrodes, of NPN transistor 35.

In the quiescent state with movable contacts 11 and 16 of respective switches 10 and 15 operated to the electrical circuit open condition, movable contacts 21 and 31 of respective relays 20 and 30 are closed to corresponding stationary contacts 24 and 34, as shown in the drawing. Under quiescent conditions, therefore, junctions 26 and 36 are at substantially ground potential, being connected to point of reference or ground potential 5 through respective resistors 27 and 37. A logic 0 signal, therefore, is present upon junction 26 and upon junction 36, Curve A of FIG. 3. Assuming that monostable multivibrator circuits 40 and 45 have timed out, a logic 0 signal is present upon the output terminal of each which are inverted to respective logic 1 signals by respective inverter circuits 41 and 46, Curves B and C of FIG. 3, respectively. As is well known in the art, the monostable multivibrator circuit normally operates in a stable state and may be switched to an alternate state by an electrical signal, in which state it remains for a period of time as determined by an internal RC timing network. After timing out, the device spontaneously returns to the stable state.

The signal upon junction 26 is applied through coupling capacitor 42 and input resistor 43 to the inverting input terminal of conventional operational amplifier circuit 50 which, with a feedback resistor 44 connected from the output terminal to the inverting input terminal thereof functions as an amplifier circuit in the inverting mode. In the actual embodiment, this amplifier circuit was designed to have a gain of 1000. As a logic 0 signal is present upon junction 26, the output signal of this amplifier circuit is a logic 0 which is applied through coupling capacitor 47 and input resistor 48 to the non-inverting input terminal of conventional operational amplifier circuit 55. With the parallel combination of feedback capacitor 51 and resistor 52 connected between the output and inverting input terminals thereof, operational amplifier circuit 55 functions as a frequency to voltage converter circuit having an output signal which is a function of the number of input pulses received during a unit period of time. As the output of operational amplifier 50 is a logic 0 at this time, the output signal of operational amplifier circuit 55 is also a logic 0 which is applied to the inverting input terminal of voltage comparator circuit 60. The non-inverting input terminal of comparator circuit 60 is connected through resistor 56 to the movable contact 57 of a conventional potentiometer circuit 58 having the resistor 59 thereof connected between the regulated supply potential $V_D$ and point of reference or ground potential 5. Consequently, the signal applied to the non-inverting input terminal of comparator circuit 60 is of a positive polarity and of a level equal to the potential drop across movable contact 57 of potentiometer 58 and point of reference or ground potential 5. As the signal upon the non-inverting input terminal of comparator circuit 60 is of a positive polarity and of a higher level than the signal applied to the inverting input terminal thereof, comparator circuit 60 produces a logic 1 output signal, Curve D of FIG. 3. Resistor 61 connected between the output terminal of comparator circuit 60 and the regulated supply potential $V_D$ is the conventional pull-up resistor.

The logic 1 output signals of inverter circuits 41 and 46 and of voltage comparator circuit 60 are applied to respective input terminals "a," "b" and "c" of NAND gate 70, consequently, NAND gate 70 produces a logic 0 output signal, Curve E of FIG. 3. The logic 0 signal present upon junction 36 and the logic 0 output signal of NAND gate 70 are applied to respective input terminals "a" and "c" of NAND gate 71, consequently, NAND gate 71 produces a logic 1 output signal, Curve F of FIG. 3. This logic 1 output signal is inverted to a logic 0 signal by inverter circuit 72 which is applied through input resistor 73 to the base electrode of NPN transistor 25. With a logic 0 present upon the base electrode thereof, transistor 25 is not conductive. The logic 0 present upon junction 36 is inverted to a logic 1 signal by inverter circuit 74, Curve G of FIG. 3. This logic 1 signal and the logic 0 output signal of NAND gate 70 are applied to respective input terminals "a" and "c" of NAND gate 75 which, because of the logic 0 signal applied to input terminal "c" thereof, produces a logic 1 output signal, Curve H of FIG. 3. This logic 1 signal is inverted to a logic 0 signal by inverter circuit 76 which is applied through resistor 77 to the base electrode of NPN transistor 35. With a logic 0 signal present upon the base electrode thereof NPN transistor 35 is not conductive. With both NPN transistors 25 and 35 in the not conducting mode, motor 4 is deenergized.

Upon the operation of movable contact 11 of ignition switch 10 to stationary contact 12 and the operation of movable contact 16 of switch 15 to stationary contact 17, a logic 1 control signal is present upon junction 36, Curve A of FIG. 3. This logic 1 control signal triggers monostable multivibrator circuit 40 to the alternate state in which a logic 1 signal is present upon the output terminal thereof. One example of a monostable multivibrator circuit which is triggerable to the alternate state upon the application of a logic 1 input signal which may be employed with the circuit of this invention is set forth in detail in FIG. 2. Timing potential is supplied by the regulated supply potential $V_D$ through resistor 79. In the initial quiescent state, input equals 0, capacitor 82 is completely discharged. Upon the application of a logic 1 signal to the uncommitted input terminal of NOR gate 80, a logic 0 signal appears upon the output terminal thereof and capacitor 82 begins to charge through resistor 79. Upon the initial appearance of the logic 0 signal upon the output terminal of NOR gate 80, a logic 0 signal appears upon junction 83 which is inverted by NOR gate 81 to a logic 1 output signal. The output remains a logic 1 signal until the voltage across capacitor 82, in charging through resistor 79, passes the threshhold value of the output inverter 81. At this time, the output signal translates to a logic 0. Upon the translation of the output signal to a logic 0, capacitor 82 discharges completely through resistor 79 to prepare the circuit for the next logic 1 input trigger pulse.

The logic 1 output signal of monostable multivibrator circuit 40 is inverted to a logic 0 signal by inverter circuit 41, Curve B of FIG. 3, which is applied to input terminal "a" of NAND gate 70. With a logic 0 signal present upon input terminal "a" thereof, NAND gate 70 produces a logic 1 output signal, Curve E of FIG. 3, which is applied to input terminal "c" of each of NAND gates 71 and 75. As the logic 1 control signal present upon junction 36, Curve A of FIG. 3, is applied to input terminal "a" of NAND gate 71 and since input terminal "b" is connected to the regulated supply potential $V_D$, a logic 1 signal is present upon all three input terminals "a," "b," and "c" thereof. As a consequence, NAND gate 71 produces a logic 0 output signal, Curve F of FIG. 3. This logic 0 signal is inverted to a logic 1 signal by inverter circuit 72 which is applied through resistor 73 to the base electrode of NPN transistor 25 in the proper polarity relationship to supply base-emitter drive current through an NPN transistor. This logic 1 signal, therefore, triggers NPN transistor 25 conductive through the collector-emitter electrodes to complete an energizing circuit for operating coil 22 of relay 20 which may be traced from the positive polarity terminal of battery 3, through leads 18 and 19, operating coil 22, the collector-emitter electrodes of NPN transistor 25 and point of reference or ground potential 5 to the negative polarity terminal of battery 3. Upon the completion of this energizing circuit, movable contact 21 of relay 20 is operated into the electrical circuit closed condition with stationary contact 23 to complete an energizing circuit for motor 4 for rotation in a first direction which may be traced from the positive polarity terminal of battery 3, through leads 18 and 19, closed contacts 23 and 21 of relay 20, motor 4, closed contacts 31 and 34 of relay 30, lead 28, resistor 27 and point of reference or ground potential 5 to the negative polarity terminal of battery 3. Upon the completion of this energizing circuit, motor 4 begins to rotate in a first direction and builds up to operating speed. As motor 4 operates, a high frequency energizing current ripple signal appears across resistor 27. This high frequency ripple signal is applied from junction 26 through coupling capacitor 42 and input resistor 43 to the inverting input terminal of operational amplifier circuit 50. Operational amplifier circuit 50 and its associated circuitry, as previously described, inverts and amplifies this high frequency ripple signal which is applied as a series of high frequency pulses to the non-inverting input terminal of operational amplifier circuit 55. The direct current output signal of operational amplifier circuit 55, the level of which is a function of the number of input pulses during a unit period of time, increases linearly in a positive going direction from zero and is applied to the inverting input terminal of comparator circuit 60. When the direct current potential level of this output signal rises to a level equal to that applied to the non-inverting input terminal of comparator circuit 60, comparator circuit 60 switches to a second state in which a logic 0 signal is present upon the output terminal thereof, Curve D of FIG. 3, which is applied to input terminal "c" of NAND gate 70. This logic 0 signal is effective to enable NAND gate 70 after monostable multivibrator circuit 40 times out and to maintain it enabled while motor 4 is in the "Run" mode. After monostable multivibrator circuit 40 times out, it spontaneously reverts to the stable state in which a logic 0 signal is present upon the output terminal thereof which is inverted to a logic 1 signal by inverter circuit 41, Curve B of FIG. 3. Although this logic 1 signal is applied to input terminal "a" of NAND gate 70, NAND gate 70 is maintained enabled by the logic 0 output signal of comparator circuit 60 applied to input terminal "c" thereof to maintain the logic 1 signal upon the output terminal thereof. With a logic 1 signal maintained upon the output terminal of NAND gate 70, NAND gate 71, inverter circuit 72 and NPN transistor 25 remain as previously described to keep motor 4 energized.

During this time, the logic 1 control signal upon junction 36 is inverted to a logic 0 signal by inverter circuit 74, Curve G of FIG. 3, which is applied to input terminal "a" of NAND gate 75. With this logic 0 signal present upon input terminal "a" thereof and the logic 0 output signal of NAND gate 70 present upon input terminal "c," NAND gate 75 produces a logic 1 output signal which is inverted to a logic 0 output signal by inverter circuit 76 which is applied through resistor 77 to the base electrode of NPN transistor 35. Transistor 35, therefore, is maintained not conductive.

When the member being driven by motor 4 reaches a travel limit, motor 4 stalls. Upon the stall of motor 4, the high frequency energizing current ripple is removed from junction 26, consequently, the output signal of operational amplifier circuits 50 and 55 fall to substantially ground. With a logic 0 or ground signal present upon the inverting input terminal and a logic 1 positive polarity potential applied to the non-inverting input terminal at this time, comparator circuit 60 produces a logic 1 output signal, Curve D of FIG. 3, which is applied to input terminal "c" of NAND gate 70. As the logic 1 output signals of inverter circuits 41 and 46, Curves B and C of FIG. 3, are applied to respective input terminals "a" and "b" of NAND gate 70, NAND gate 70 produces a logic 0 output signal, Curve E of FIG. 3, which is applied to input terminal "c" of each of NAND gates 71 and 75. With a logic 0 signal present upon input terminal "c" thereof, NAND gate 71 produces a logic 1 output signal, Curve F of FIG. 3. This logic 1 signal is inverted to a logic 0 signal by inverter circuit 72 which is applied through resistor 73 to the base electrode of NPN transistor 25 to render this device not conductive. When NPN transistor 25 is rendered not conductive, the energizing circuit previously described for operating coil 22 of relay 20 is interrupted thereby. Upon the interruption of this energizing circuit, movable contact 21 of relay 20 is released from stationary contact 23 and operates into electrical circuit closing contact with stationary contact 24 and motor 4 is deenergized.

Upon the operation of either movable contact 11 of ignition switch 10 out of electrical contact with stationary contact 12 or upon the operation of movable contact 16 of switch 15 out of electrical contact with stationary contact 17, the logic 1 control signal is removed from junction 36, Curve A of FIG. 3. Upon the removal of the control signal, a logic 0 signal is present upon junction 36. This logic 0 signal is inverted by inverter circuit 85 to a logic 1 signal which triggers monostable multivibrator circuit 45 to the alternate state in which a logic 1 signal is present upon the output terminal thereof.

The logic 1 output signal of monostable multivibrator circuit 45 is inverted to a logic 0 signal by inverter circuit 46, Curve C of FIG. 3, which is applied to input terminal "b" of NAND gate 70. With a logic 0 signal present upon input terminal "b" thereof, NAND gate 70 produces a logic 1 output signal, Curve E of FIG. 3, which is applied to input terminal "c" of each of NAND gates 71 and 75. The logic 0 signal present upon junction 36, Curve A of FIG. 3, is inverted to a logic 1 signal by inverter circuit 74 which is applied to input terminal "a" of NAND gate 75. Since input terminal "b" is connected to the regulated supply potential $V_D$, a logic 1 signal is present upon all three input terminals "a," "b" and "c" of NAND gate 75. As a consequence, NAND gate 75 produces a logic 0 output signal, Curve H of FIG. 3. This logic 0 signal is inverted to a logic 1 signal by inverter circuit 76 which is applied through resistor 77 to the base electrode of NPN transistor 35 in the proper polarity relationship to supply base-emitter drive current through an NPN transistor. This logic 1 signal, therefore, triggers NPN transistor 35 conductive through the collector-emitter electrodes to complete an energizing circuit for operating coil 32 of relay 30 which may be traced from the positive polarity terminal of battery 3, through lead 18, operating coil 32, the collector-emitter electrodes of NPN transistor 35 and point of reference or ground potential 5 to the negative polarity terminal of battery 3. Upon the completion of this energizing circuit, movable contact 31 of relay 30 is operated into the electrical circuit closed condition with stationary contact 33 to complete an energizing circuit for motor 4 for rotation in a second direction which may be traced from the positive polarity terminal of battery 3, through lead 18, closed contacts 33 and 31 of relay 30, motor 4, closed contacts 21 and 24 of relay 20, lead 28, resistor 27 and point of reference or ground potential 5 to the negative polarity terminal of battery 3. Upon the completion of this energizing circuit, motor 4 begins to rotate in a second direction and builds up to operating speed. As motor 4 operates, a high frequency energizing current ripple signal appears across resistor 27. This high frequency ripple signal is applied from junction 26 through coupling capacitor 42 and input resistor 43 to the inverting input terminal of operational amplifier circuit 50. Operational amplifier circuit 50 and its associated circuitry, as previously described, inverts and amplifies this high frequency ripple signal which is applied as a series of high frequency pulses to the noninverting input terminal of operational amplifier circuit 55. The direct current output signal of operational amplifier circuit 55, the level of which is a function of the number of input pulses during a unit period of time, increases linearly in a positive going direction from zero and is applied to the inverting input terminal of comparator circuit 60. When the direct current potential level of this output signal rises to a level equal to that applied to the noninverting input terminal of comparator circuit 60, comparator circuit 60 switches to a second state in which a logic 0 signal is present upon the output terminal thereof, Curve D of FIG. 3, which is applied to input terminal "c" of NAND gate 70. This logic 0 signal is effective to enable NAND gate 70 after monostable multivibrator circuit 45 times out and to maintain it enabled while motor 4 is in the "Run" mode. After monostable multivibrator circuit 45 times out, it spontaneously reverts to the stable state in which a logic 0 signal is present upon the output terminal thereof which is inverted to a logic 1 signal by inverter circuit 46, Curve C of FIG. 3. Although this logic 1 signal is applied to input terminal "b" of NAND gate 70, NAND gate 70 is maintained enabled by the logic 0 output signal of comparator circuit 60 applied to input terminal "c" thereof to maintain the logic 1 signal upon the output terminal thereof. With a logic 1 signal maintained upon the output terminal of NAND gate 70, NAND gate 75, inverter circuit 76 and NPN transistor 35 remain as previously described to keep motor 4 energized.

During this time, the logic 0 signal upon junction 36, Curve A of FIG. 3, is applied to input terminal "a" of NAND gate 71. With this logic 0 signal present upon input terminal "a" thereof, NAND gate 71 produces a logic 1 output signal which is inverted to a logic 0 output signal by inverter circuit 72 and is applied through resistor 73 to the base electrode of NPN transistor 25. Transistor 25, therefore, is maintained not conductive.

When the member being driven by motor 4 reaches a travel limit, motor 4 stalls. Upon the stall of motor 4, the high frequency energizing current ripple is removed from junction 26, consequently, the output signal of operational amplifier circuits 50 and 55 fall to substantially ground. With a logic 0 or ground signal present upon the inverting input terminal and a logic 1 positive polarity potential applied to the non-inverting input terminal at this time, comparator circuit 60 produces a logic 1 output signal, Curve D of FIG. 3, which is applied to input terminal "c" of NAND gate 70. As the logic 1 output signals of inverter circuits 41 and 46, Curves B and C of FIG. 3, are applied to respective input terminals "a" and "b" of NAND gate 70, NAND gate 70 produces a logic 0 output signal, Curve E of FIG. 3, which is applied to input terminal "c" of each of NAND gates 71 and 75. With a logic 0 signal present upon input terminal "c" thereof, NAND gate 75 produces a logic 1 output signal, Curve H of FIG. 3. This logic 1 signal is inverted to a logic 0 signal by inverter circuit 76 which is applied through resistor 77 to the base electrode of NPN transistor 35 to render this device not conductive. When NPN transistor 35 is rendered not conductive, the energizing circuit previously described for operating coil 32 of relay 30 is interrupted thereby. Upon the interruption of this energizing circuit, movable contact 31 of relay 30 is released from stationary contact 33 and operates into electrical circuit closing contact with stationary contact 34 and motor 4 is deenergized.

From this description, it is apparent that the timing networks of monostable multivibrator circuits 40 and 45 are so designed that these devices remain in the alternate operating state for a period of time sufficient for motor 4 to come up to operating speed but less than that required for the driven member to be driven through a travel stroke.

In an alternative embodiment of the electric motor reversing control system of this invention, monostable multivibrator circuits 40 and 45 and inverter circuits 41, 46 and 85 may be replaced by a commercially available dual monostable multivibrator package marketed by Motorola Inc. under the designation MC14528.

FIG. 4 of the drawings indicates how this dual monostable multivibrator package MC14528 may be inserted in the circuit of FIG. 1. In FIG. 4, like elements have been assigned like characters of reference. As both sections 90A and 90B of this package operate in an identical manner, only one will be explained in detail. In the quiescent state with a logic 1 signal upon the "B" input terminal, a logic 0 signal upon the "A" input terminal and a logic 1 signal applied to input terminal "$C_D$," input terminal "$T_2$" is floating, capacitor 86A has been fully charged by way of resistor 87A, the signal upon output terminal "Q" is a logic 0 and the signal upon output terminal "$\overline{Q}$" is a logic 1. When the input signal applied to input terminal "A" goes to a logic 1 or when the input signal applied to input terminal "B" goes to a logic 0, input terminal "$T_2$" becomes 0 and capacitor 86A is discharged rapidly through an internal N-channel field effect transistor. When the voltage across capacitor 86A is equal to the threshhold voltage of an internal inverter circuit, the signal upon output terminal "Q" goes to a logic 1 and the signal upon output terminal "$\overline{Q}$" goes to a logic 0. The time required before the output terminal "Q" and "$\overline{Q}$" output signals change depends upon the value of capacitor 86A and the value of the internal N-channel field effect transistor resistance. The discharge cycle is stopped when capacitor 86A voltage reaches another lower threshhold value at which the internal N-channel field effect transistor switches abruptly off. Capacitor 86A then begins to recharge slowly through resistor 87A until the transfer point of the internal inverter circuit is again passed, causing the output signals upon output terminals "Q" and "$\overline{Q}$" to revert to their original status.

Upon the closure of both movable contact 11 of switch 10 of FIG. 1 to stationary contact 12 and movable contact 16 of switch 15 to stationary contact 17, a logic 1 control signal appears upon junction 36 which is applied to input terminal "A" of section 90A. As the input signal upon input terminal "A" translates to a logic 1, a logic 0 signal is produced upon the "$\overline{Q}$" output terminal of section 90A which is applied to input terminal "a" of NAND gate 70. With a logic 0 signal present upon input terminal "a" thereof, NAND gate 70 produces a logic 1 output signal, Curve E of FIG. 3. In response to the logic 1 output signal of NAND gate 70, NAND gate 71, inverter 72 and NPN transistor 25 of FIG. 1 operate in a manner previously explained to effect the energization of motor 4 for rotation in the first direction.

Upon the opening of either switch 10 of FIG. 1 or switch 15 to remove the control signal, a logic 0 signal appears upon junction 36 which is applied to input terminal "B" of section 90B. As the input signal upon input terminal "B" translates to a logic 0, a logic 0 signal is produced upon the "$\overline{Q}$" output terminal of section 90B which is applied to input terminal "b" of NAND gate 70. With a logic 0 signal present upon input terminal "b" thereof, NAND gate 70 produces a logic 1 output signal, Curve E of FIG. 3. In response to the logic 1 output signal of NAND gate 70, NAND gate 75, inverter circuit 76 and NPN transistor 35 of FIG. 1 operate in a manner previously explained to effect the energization of motor 4 in the second direction.

From the foregoing description, it is apparent that the control circuit of this invention may be used with a commutated electric motor capable of being stalled and is effective to energize the motor for a time sufficient to bring it up to the running speed in first and second directions of rotation in response to the application and removal of a control signal, respectively, is responsive to motor energizing current ripple while the motor is in the "Run" mode to maintain the motor energized, and is effective to deenergize the motor upon the termination of motor energizing current ripple when the motor stalls.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A control circuit for an electric motor capable of being stalled when a member driven thereby reaches either of two opposite travel limits comprising in combination: electrically operable switching means effective to energize said motor for rotation in a first direction and in a second direction in response to respective mutually exclusive electrical signals and to deenergize said motor upon the termination thereof; and circuit means for producing a first electrical signal upon the application of a control signal thereto and a second mutually exclusive electrical signal upon the removal of said control signal therefrom, for applying the one of said electrical signals so produced to said electrically controllable switching means, for maintaining the one of said electrical signals so produced while said motor is in the run mode and for terminating the one of said electrical signals so produced upon motor stall when said driven member has reached a said travel limit.

2. A control circuit for a commutated electric motor capable of being stalled when a member driven thereby reaches either of two opposite travel limits comprising in combination: electrically operable switching means effective to energize said motor for rotation in a first direction and in a second direction in response to respective mutually exclusive electrical signals and to deenergize said motor upon the termination thereof; and circuit means for producing a first electrical signal upon the application of a control signal thereto and a second mutually exclusive electrical signal upon the removal of said control signal therefrom, for applying the one of said electrical signals so produced to said electrically controllable switching means, for maintaining the one of said electrical signals so produced in response to motor energizing current ripple while said motor is in the run mode and for terminating the one of said electrical signals so produced upon motor stall when said driven member has reached a said travel limit.

3. A control circuit for a commutated electric motor capable of being stalled, comprising in combination: means effective to energize said motor for a time sufficient to bring it to the running condition; and means responsive to motor energizing current ripple while said motor is in the run mode to maintain said energization so as to continue the motor operation and effective upon termination of said motor energizing current ripple to deenergize said motor.

4. A control circuit for an electric motor capable of being stalled when a member driven thereby reaches either of two opposite travel limits comprising in combination: electrically operable switching means effective to energize said motor for rotation in a first direction and in a second direction in response to respective mutually exclusive electrical signals and to deenergize said motor upon the termination thereof; circuit means enabled in response to the application of a control signal thereto and to the removal of said control signal therefrom for producing while so enabled respective mutually exclusive first and second electrical signals effective, respectively, to operate said switching means to energize said motor for rotation in a first direction and to operate said switching means to energize said motor for rotation in a second direction; and means effective to maintain said circuit means enabled while said motor is in the run mode and to disable said circuit means upon motor stall when said driven member has reached a said travel limit.

5. A control circuit for a commutated electric motor capable of being stalled when a member driven thereby reaches either of two opposite travel limits comprising in combination: electrically operable switching means effective to energize said motor for rotation in a first direction and in a second direction in response to respective mutually exclusive electrical signals and to deenergize said motor upon the termination thereof; circuit means enabled in response to the application of a control signal thereto and to the removal of said control signal therefrom for producing while so enabled respective mutually exclusive first and second electrical signals effective, respectively, to operate said switching means to energize said motor for rotation in a first direction and to operate said switching means to energize said motor for rotation in a second direction; and means effective to maintain said circuit means enabled in response to motor energizing current ripple while said motor is in the run mode and to disable said circuit means upon motor stall when said driven member has reached a said travel limit.

6. A control circuit for a commutated electric motor capable of being stalled when a member driven thereby reaches either of two opposite travel limits comprising in combination: electrically operable switching means effective to energize said motor for rotation in a first direction and in a second direction in response to respective mutually exclusive electrical signals and to deenergize said motor upon the termination thereof; means for producing discrete first and second electrical signals, each of a predetermined time duration, in response to the application and removal, respectively, of an electrical control signal; first circuit means enabled by at least one of said first and second electrical signals for producing while so enabled a third electrical signal; second circuit means responsive to said third electrical signal and said control signal for producing an output signal effective to operate said switching means to energize said motor for rotation in a first direction; third circuit means responsive to said third electrical signal and the removal of said control signal for producing an output signal effective to operate said switching means to energize said motor for rotation in a second direction; and means effective to maintain said first circuit means enabled while said motor is in the run mode and to disable said first circuit means upon motor stall when said driven member has reached a said travel limit.

7. A control circuit for a commutated electric motor capable of being stalled when a member driven thereby reaches either of two opposite travel limits comprising in combination: electrically operable switching means effective to energize said motor for rotation in a first direction and in a second direction in response to respective mutually exclusive electrical signals and to deenergize said motor upon the termination thereof; means for producing discrete first and second electrical signals, each of a predetermined time duration, in response to the application and removal, respectively, of an electrical control signal; first circuit means enabled by at least one of said first and second electrical signals for producing while so enabled a third electrical signal; second circuit means responsive to said third electrical signal and said control signal for producing an output signal effective to operate said switching means to energize said motor for rotation in a first direction; third circuit means responsive to said third electrical signal and the removal of said control signal for producing an output signal effective to operate said switching means to energize said motor for rotation in a second direction; and means effective to maintain said first circuit means enabled in response to motor energizing current ripple while said motor is in the run mode and to disable said first circuit means upon motor stall when said driven member has reached a said travel limit.

* * * * *